US012627745B1

(12) United States Patent
Kapoor et al.

(10) Patent No.: US 12,627,745 B1
(45) Date of Patent: May 12, 2026

(54) INTELLIGENT CONNECTION MANAGEMENT AND PUSH- BASED UPDATES FOR A CLOUD-BASED PLATFORM

(71) Applicant: DK CROWN HOLDINGS INC., Boston, MA (US)

(72) Inventors: Rohan Kapoor, Malden, MA (US); Vasil Trifonov, Pleven (BG); Louis Wright, Manchester (GB)

(73) Assignee: DK CROWN HOLDINGS INC., Boston, MA (US)

( * ) Notice: Subject to any disclaimer, the term of this patent is extended or adjusted under 35 U.S.C. 154(b) by 0 days.

(21) Appl. No.: 19/273,511

(22) Filed: Jul. 18, 2025

(51) Int. Cl.
*G06F 15/16* (2006.01)
*H04L 67/141* (2022.01)
*H04L 67/55* (2022.01)

(52) U.S. Cl.
CPC ............ *H04L 67/55* (2022.05); *H04L 67/141* (2013.01)

(58) Field of Classification Search
CPC ............................. H04L 67/55; H04L 67/141
See application file for complete search history.

(56) References Cited

U.S. PATENT DOCUMENTS

| | | | | |
|---|---|---|---|---|
| 12,367,353 | B1 * | 7/2025 | Mohammed ........... | G06V 30/19 |
| 2013/0086142 | A1 * | 4/2013 | Hampel ................ | H04L 67/148 |
| | | | | 709/203 |
| 2014/0125702 | A1 * | 5/2014 | Santillan ................. | A63F 13/92 |
| | | | | 345/633 |
| 2017/0161387 | A1 * | 6/2017 | Schuchardt ............. | G06F 1/163 |
| 2023/0401267 | A1 * | 12/2023 | Cai ...................... | G06F 16/9535 |
| 2024/0095819 | A1 * | 3/2024 | Bakhle ................... | G06Q 40/02 |
| 2025/0390199 | A1 * | 12/2025 | Berezhnoy .......... | G06F 3/04817 |

* cited by examiner

*Primary Examiner* — Duyen M Doan
(74) *Attorney, Agent, or Firm* — Barnes & Thornburg LLP

(57) ABSTRACT

Techniques for managing the distribution of platform content updates to client devices includes a system that receives a connection request from a client device to access one or more resources of a software platform via a client application. The system establishes, in response to the request, a bidirectional network connection with the client device and retrieves one or more initial data streams from application programming interfaces (APIs) of the platform. The system transmits, over the bidirectional network connection, the data streams for presentation on a user interface of the client application. The system retrieves subsequent data streams corresponding to the initial data streams based on prior user interactions with the initial data streams.

20 Claims, 7 Drawing Sheets

500

600

INTELLIGENT CONNECTION MANAGEMENT AND PUSH- BASED UPDATES FOR A CLOUD-BASED PLATFORM

BACKGROUND

Cloud network environments provide scalable computing resources to enable execution of a software platform architecture serving numerous users. For example, an online sportsbook platform may operate on the cloud environment and leverage these computing resources to process high volumes of real-time data (e.g., live sports event data, user bets, statistics, user social interactions, etc.) and deliver a quality experience to users engaging with the platform to bet on sports events, view progress of various events, and interact with other users.

SUMMARY

An embodiment presented herein discloses a system having one or more processors and a memory storing instructions. When executed on the one or more processors, the instructions cause the system to receive a first connection request from a client device to access one or more resources of a software platform via a client application executing on the client device. In response to the first connection request, a bidirectional network connection is established with the client device. The system retrieves one or more initial data streams from a plurality of application programming interfaces (APIs) of the software platform and transmits, to the client device over the bidirectional network connection, the initial one or more data streams for presentation on a user interface of the client application. The system receives one or more indications of user interactions with the at least one of the initial one or more data streams over the bidirectional network connection. A second connection request from the client device to access the one or more resources of the software platform is received via the client application. The system establishes, in response to the second connection request, a second network connection with the client device and retrieves subsequent data streams from the APIs. The subsequent data streams correspond to the initial one or more data streams. The one or more subsequent data streams is transmitted over the second network connection for presentation on the user interface.

Another embodiment presented herein discloses a method. The method generally includes receiving a first connection request from a client device to access one or more resources of a software platform via a client application executing on the client device. In response to the first connection request, a bidirectional network connection is established with the client device. The method also includes retrieving one or more initial data streams from a plurality of application programming interfaces (APIs) of the software platform and transmits, to the client device over the bidirectional network connection, the initial one or more data streams for presentation on a user interface of the client application. One or more indications of user interactions the initial one or more data streams over the bidirectional network connection is received. A second connection request from the client device to access the one or more resources of the software platform is received via the client application In response to the second connection request, a second network connection with the client device and retrieves subsequent data streams from the APIs is established. The subsequent data streams correspond to the initial one or more data streams. The one or more subsequent data streams is transmitted over the second network connection for presentation on the user interface.

Yet another embodiment presented herein discloses one or more machine-readable storage media storing instructions. When executed on one or more processors, the instructions cause the system to receive a first connection request from a client device to access one or more resources of a software platform via a client application executing on the client device. In response to the first connection request, a bidirectional network connection is established with the client device. The system retrieves one or more initial data streams from a plurality of application programming interfaces (APIs) of the software platform and transmits, to the client device over the bidirectional network connection, the initial one or more data streams for presentation on a user interface of the client application. The system receives one or more indications of user interactions with the at least one of the initial one or more data streams over the bidirectional network connection. A second connection request from the client device to access the one or more resources of the software platform is received via the client application. The system establishes, in response to the second connection request, a second network connection with the client device and retrieves subsequent data streams from the APIs. The subsequent data streams correspond to the initial one or more data streams. The one or more subsequent data streams is transmitted over the second network connection for presentation on the user interface.

BRIEF DESCRIPTION OF THE DRAWINGS

The foregoing aspects and other features of the disclosure are explained in the following description, taken in connection with the accompanying example drawings relating to one or more embodiments.

DETAILED DESCRIPTION

Figure 1:
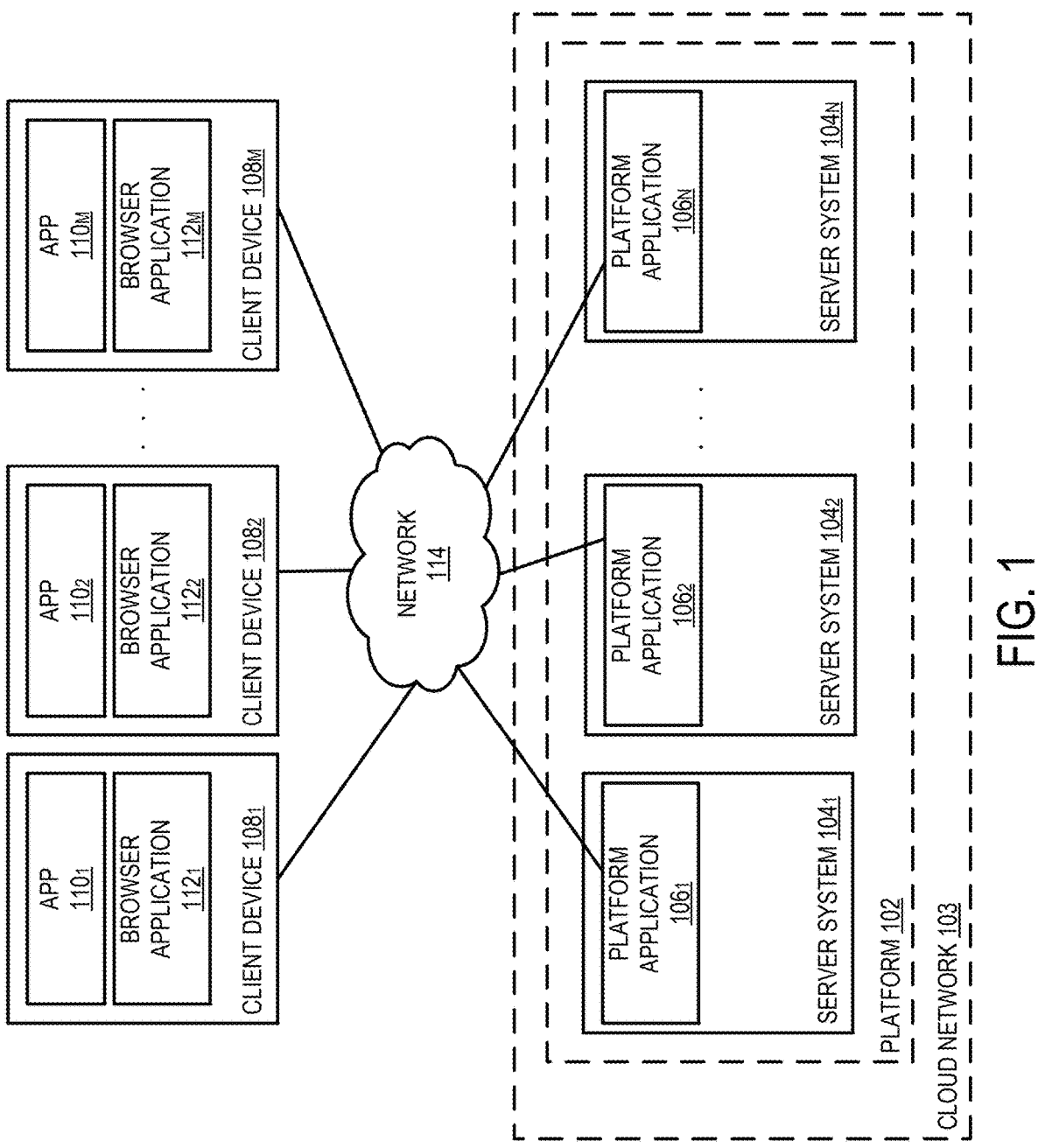
FIG. 1 illustrates an example computing environment of an online sportsbook platform that transmits platform updates to client applications, according to an embodiment.

A known concern for platforms executing in cloud environments is ensuring that relevant content is pushed to platform users in a timely manner. For instance, in an online sportsbook platform, users generally expect personalized content such as suggested bets, targeted promotions, news relating to teams or events that the user might be interested in, etc. to be regularly pushed to their client application feeds. However, given the voluminous amount of data (including real-time sports event data, user data, financial data, marketing data, regulatory compliance data, and so on), existing approaches for delivering such content can be computationally intensive. For instance, platforms typically ingest data and apply various filters on the entire set of data based on a set of predefined rules given certain inputs (e.g., user-specified preferences, historical interactions with the platform through the client application, contexts such as time of day, currently live events, geolocation, etc.). Further, the client application manages multiple network connections with the platform (e.g., server-sent event (SSE) connections) and logic to visualize the content on a graphical user interface (GUI). However, this typical approach introduces latency and inefficiency over multiple network connections providing more data than what is likely relevant to the user.

Embodiments presented herein disclose improved technologies for intelligently managing platform content updates to client devices. More particularly, the disclosed technologies provide a backend-for-frontend (BFF) service that provides real-time updates to a client device based on user contexts and activity sourced from different dependencies in the platform (e.g., software systems and data streams). The BFF service maintains a client-level context in the platform backend, which enables the BFF service to intelligently distribute streams of data relevant to an underlying user of the client application over a single network communication channel (e.g., over a WebSocket connection). For example, in the online sportsbook platform scenario, the BFF service of the disclosed technologies may track user bets and events accessed by a given client device over a single network connection and distribute content relating to the tracked bets and events through the same connection.

Advantageously, the disclosed technologies reduce client network usage and hence provides network efficiency in the platform. Instead of distributing content updates to all client devices, the platform controls which client devices to transmit content updates based on client device interaction with the platform based in part on user interactions with the platform observed in the platform backend. Further advantageously, the disclosed technology improves upon client application visualization in platforms that regularly process time-sensitive live event data. Particularly, the platform provides real-time content updates to a client device based on user activity and interactions with the platform (e.g., such as betting contexts and activity) sourced from multiple dependencies. By regularly updating the client device with data relevant to the user through the GUI, such as live progress of a given game that the user has placed bets in, the disclosed technology improves the user experience when engaging with the platform though the client device.

Note, the present disclosure uses an online sportsbook platform as a reference example of a software computing environment that intelligently distributes content for display on a client device based on user platform interactions tracked by the platform in the backend. Of course, one of skill in the art will recognize that the embodiments disclosed herein may be adapted to a variety of other software platforms in which identifiable events occur in real-time, such as online ticket sales and distribution sites, ecommerce platforms, content streaming sites, and so on.

Referring now to FIG. 1, an example computing environment 100 is provided. As shown, the computing environment 100 includes a platform 102 which includes server systems $104_{1-N}$. The computing environment 100 further includes client devices $108_{1-M}$. Each of the server systems 104, client devices 108, and external services 116 are interconnected via a network 114, such as the Internet.

In an embodiment, the server systems 104 of the platform 102 relate to computing resources used to provide a sports entertainment and gaming platform executing one or more services, such as an online sportsbook service, fantasy sports service, casino service, and the like. The services may execute via one or more platform applications $106_{1-N}$. A server system 104 may be embodied as a physical computing system or a virtual computing instance executing in a cloud environment. The server systems 104 may be physically and/or logically grouped to provide the one or more services via the platform applications $106_{1-N}$.

Client devices $108_{1-M}$ may access the platform applications $106_{1-N}$ through a variety of means, such as through a platform-specific app 110 or through a web interface rendered in a browser application 112. The app 110 (or the web interface) provides access to a sportsbook service to a user of the platform (provided by the platform applications $106_{1-N}$), enabling the user to place bets on various sporting events through a graphical user interface (GUI). For example, the user may, via the GUI of the app 110 (or web interface), place a moneyline or spread bet on an outcome of a football game taking place on a given date. As another example, the user may place a parlay bet on a number of outcomes occurring across multiple sporting events. The app 110 may also provide social media functions such as a user feed to allow users to interact with one another regarding sports events and share betting activity. A client device 108 may be embodied as a physical computing system (e.g., a desktop computer, laptop computer, mobile device such as a smartphone or tablet, etc.) or a virtual computing instance executing on a cloud provider network.

The platform applications $106_{1-N}$ provide content through various services interfacing with the client devices 108, such as sports data APIs providing live sports event information, historical sports event information, statistics, odds, etc.; cashout APIs providing eligibility assessment conditions data, offer generation data, settlement data, etc.; social media APIs providing content sharing functions, social media network integration functions, user data, etc.; marketing APIs providing affiliate integration functions, marketing campaign tracking functions, campaign generation functions, etc; and bet reporting APIs providing bet tracking data, historical bet data, live odds data, etc.

In some embodiments, the platform 102 (and services provided by the platform 102) may be implemented as a microservice architecture on a virtual machine or container-based cluster infrastructure. The infrastructure may provide components for deploying, scaling, and managing microservices and workloads. For example, the platform 102 may be implemented using a public open source cluster architecture such as Kubernetes. Other examples include, but are not limited to, Docker, Amazon ECS, and Azure Container Instances.

Figure 2:
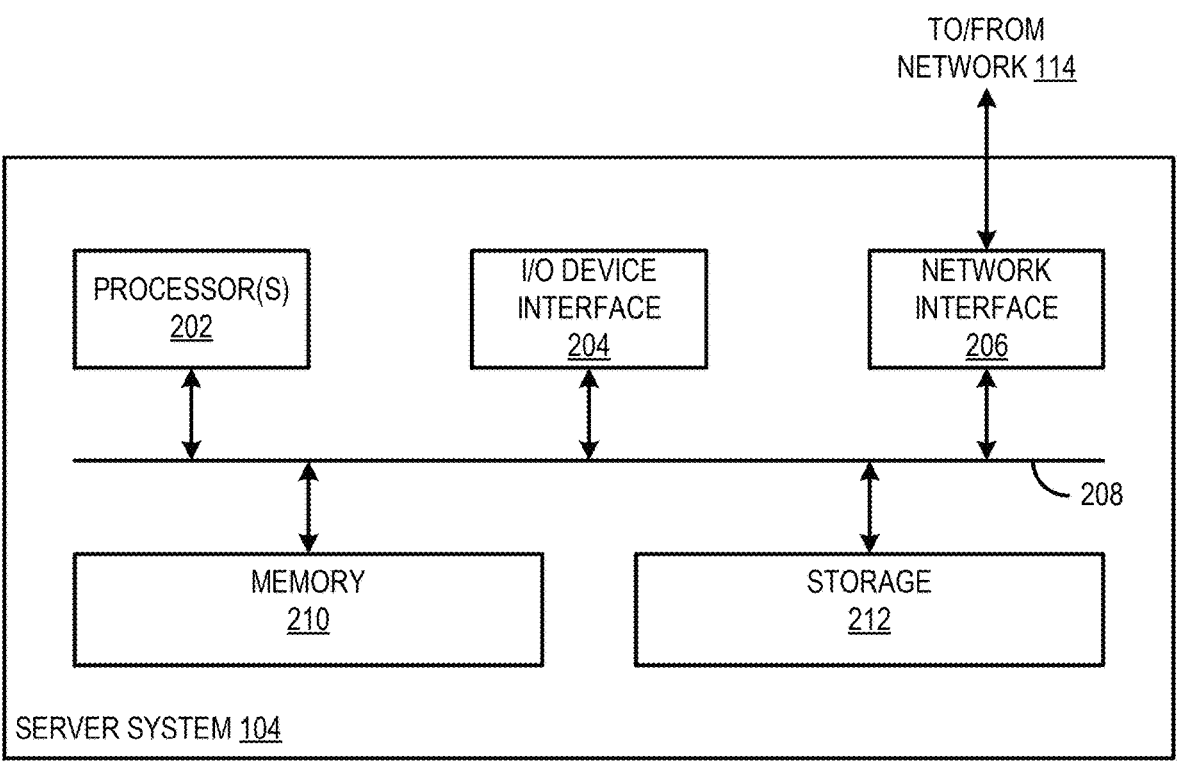
FIG. 2 illustrates components of an example server system of the online sportsbook platform of FIG. 1, according to an embodiment.

Turning briefly to FIG. 2, a block diagram further illustrating hardware and software components of an example server system 104 is shown. As shown, the server system 104 includes, without limitation, one or more processors 202, an I/O device interface 204, a network interface 206, a memory 210, and a storage 212, each interconnected via a hardware bus 208. Of course, the actual server system 104 will include a variety of additional hardware (or software-based) components not shown. Additionally, in some embodiments, one or more of the illustrative components may be incorporated in, or otherwise form a portion of, another component.

The processor 202 retrieves and executes programming instructions stored in the memory 210 capable of performing the functions described herein. The processor 202 may be embodied as a single or multi-core processor(s), a graphics processor, a microcontroller, or other processor or processing/controlling circuit. In some embodiments, the processor 202 may be embodied as, include, or be coupled to a field programmable gate array (FPGA), an application-specific integrated circuit (ASIC), reconfigurable hardware or hardware circuitry, or other specialized hardware to enable performance of the functions described herein. The hardware bus 208 is used to transmit instructions and data between the processor 202, storage 212, network interface 206, and the memory 210. The memory 210 may be embodied as any type of volatile (e.g., dynamic random access memory, etc.) or non-volatile memory (e.g., byte addressable memory) or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces.

The network interface 206 may be embodied as any hardware, software, or circuitry (e.g., a network interface card) used to connect the server system 104 over the network 114 and providing the network communication component functions described above. For example, the network interface 206 may be embodied as any communication circuit, device, or collection thereof, capable of enabling communications over the network 114 between the server system 104 and other devices. The network interface 206 may be configured to use any one or more communication technology (e.g., wired, wireless, and/or cellular communications) and associated protocols (e.g., Ethernet, Bluetooth®, Wi-Fi®, WiMAX, 5G-based protocols, etc.) to effect such communication. For example, to do so, the network interface 206 may include a network interface controller (NIC, not shown), embodied as one or more add-in-boards, daughtercards, controller chips, chipsets, or other devices that may be used by the server system 104 for network communications with remote devices (e.g., the client devices 108). For example, the NIC may be embodied as an expansion card coupled to the I/O device interface 204 over an expansion bus such as PCI Express.

The I/O device interface 204 allows I/O devices to communicate with hardware and software components of the server system 104. For example, the I/O device interface 204 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O device interface 204 may form a portion of a system-on-a-chip (SoC) and be incorporated, along with one or more of the CPU/GPU 202, the memory 210, and other components of the server system 104.

The I/O devices (not shown) may be embodied as any type of I/O device connected with or provided as a component to the server system 104, such as keyboards, mice, and printers. In an embodiment, the server system 104 may execute an instance of the platform application 106 (or one or more microservices associated with the platform application 106). In an embodiment, the server system 104 may execute a backend-for-frontend (BFF) service configured to perform the functions described herein, such as caching interactions with platform user interfaces by client devices 108 and distributing content updates to the client devices 108 based on the cached interactions.

The storage 212 may be embodied as any type of device configured for short-term or long-term storage of data such as, for example, memory devices and circuits, memory cards, hard disk drives (HDDs), solid-state drives (SSDs), or other data storage devices. The storage 212 may include a system partition that stores data and firmware code for the storage 212. The storage 212 may also include an operating system partition that stores data files and executables for an operating system. The storage 212 may store cached user activity (e.g., contexts and interactions with user interfaces of the platform 102 by client devices 108) for use in identifying relevant content updates to distribute to a given client device 108 over a network connection.

Figure 3:
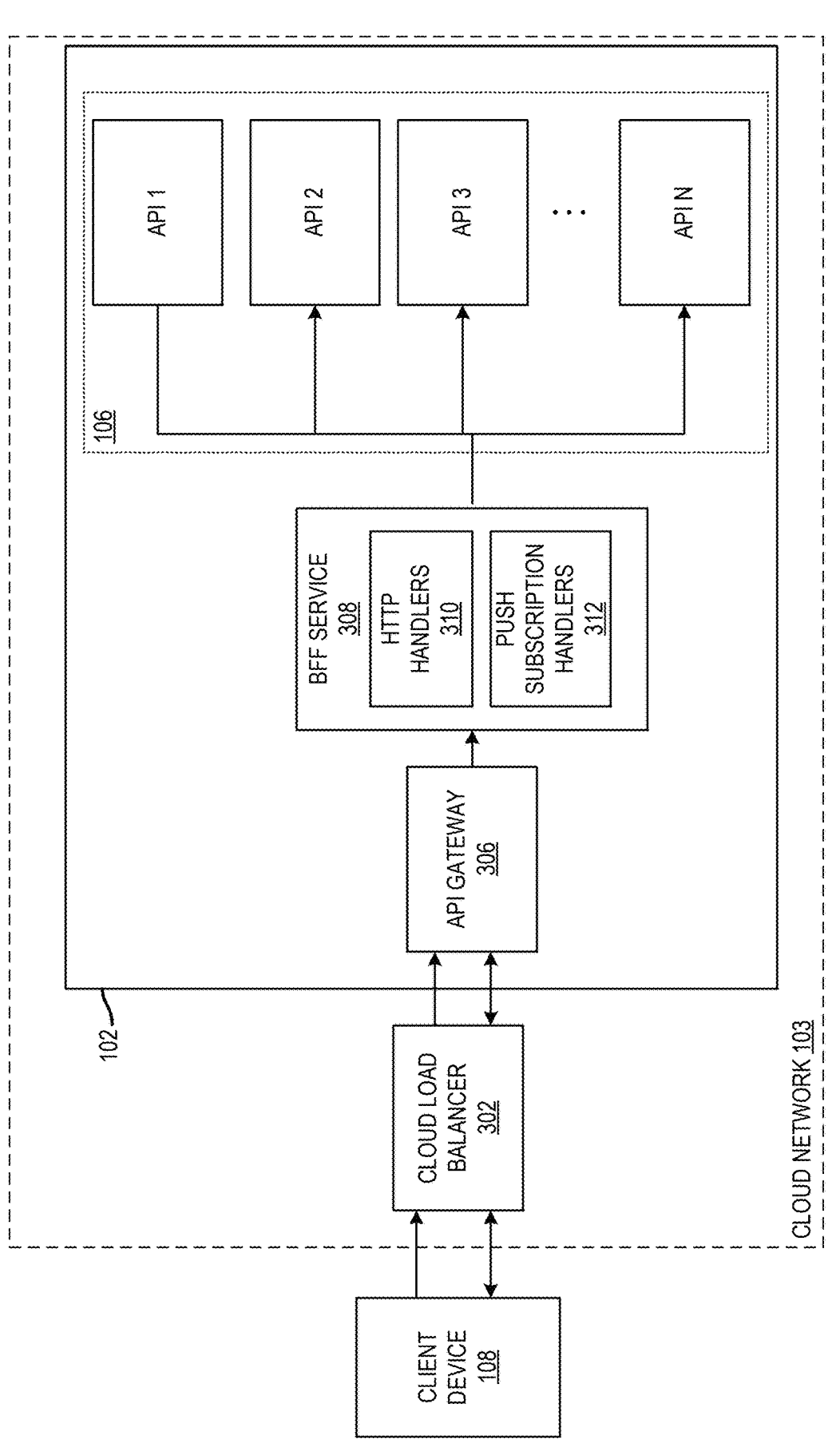
FIG. 3 illustrates a conceptual block diagram of an example operational environment for the online sportsbook platform of FIG. 1, according to an embodiment.

Referring now to FIG. 3, a conceptual diagram depicting an example software architecture in which a backend-for-frontend (BFF) service 308 is configured to handle client requests and transmit content updates associated with the platform 102. More particularly, the BFF service 308 supports communications from client applications (e.g., the mobile app 110, web interface on browser application 112, etc.) over a network connection when accessing a given page of the platform interface. For instance, the client device 108, in accessing a page (or other view) displaying a user's bets and associated information on the mobile app 110, may open a WebSocket connection to the BFF service 308.

The request to open the connection may be routed through a cloud load balancer 302 of the cloud network 103, which is configured to distribute client device traffic to one of the server systems 104 of the platform 102. An API gateway 306 in the platform 102 receives and processes the request and routes the request to the BFF service 308 (e.g., executing on one of the server systems 104).

The BFF service 308 may include HTTP handlers 310 and push subscription handlers 312. The HTTP handlers 310 process HTTP requests from the client device 110, such as by authenticating the request (e.g., ensuring that the request includes valid JWT tokens), call a specific backend API, etc. The push subscription handlers 312 manage push-based subscriptions of client devices 110 to one or more APIs 106 and processes real-time updates from data object streams (e.g., live event updates, scores, player stats, betting odds, etc.) generated by the APIs of the platform application 106. The client device 110 may subscribe to real-time data feeds via a network connection (e.g., WebSocket, Server-Sent Events, HTTP POST, etc.). The push subscription handlers 312 may parse and process the data streams in sending updates to the client device 110 relating to subscribed feeds.

The BFF service 308 may return a list of bets and associated information to the client device 110, which displays the bets and relevant information via the app 110 on a page display. As the user interacts with the page (e.g., scrolling through bet information; changing tabs to different views such as open bets, cash out opportunities, settled bets, etc.; accessing different widgets; filtering and sorting events; and the like), the app 110 makes corresponding pull calls over the single WebSocket connection, which the BFF service 308 may cache in the backend of the platform application 106. As further described herein, in doing so, the BFF service 308 tracks the user interactions, which the BFF service 308 can use to push (or otherwise transmit) any relevant content updates to keep information to the user updated in real-time and encourage additional user interaction with the app 110. For example, the BFF service 308 may transmit content updates relating to APIs 106 more frequently accessed by the app 110 (e.g., bets API, cashout API, etc.) based on tracking a frequency of accesses in the cache.

In an embodiment, the BFF service 308 transmits the content updates over a single open network connection initiated by the client, such as an open WebSocket connection using the Observables framework in .Net, through other types of network connections may be used (e.g., SignalR-based WebSocket connection, gRPC, etc.). Network connection types such as WebSocket enable persistent two-way communications that allow the client device 108 and server system 104 to send messages independently in real-time and have advantages of low latency, reduced bandwidth overhead, and consume fewer network resources, which is effective in streaming data objects in real-time. Further, the BFF service 308 may generate long-running threads for data streams to handle infinitely restarting SSE streams for connections to dependencies. User connections to the data streams may be controlled using a task pool, which allows for efficient management for multiple types of connection protocols.

Figure 4:
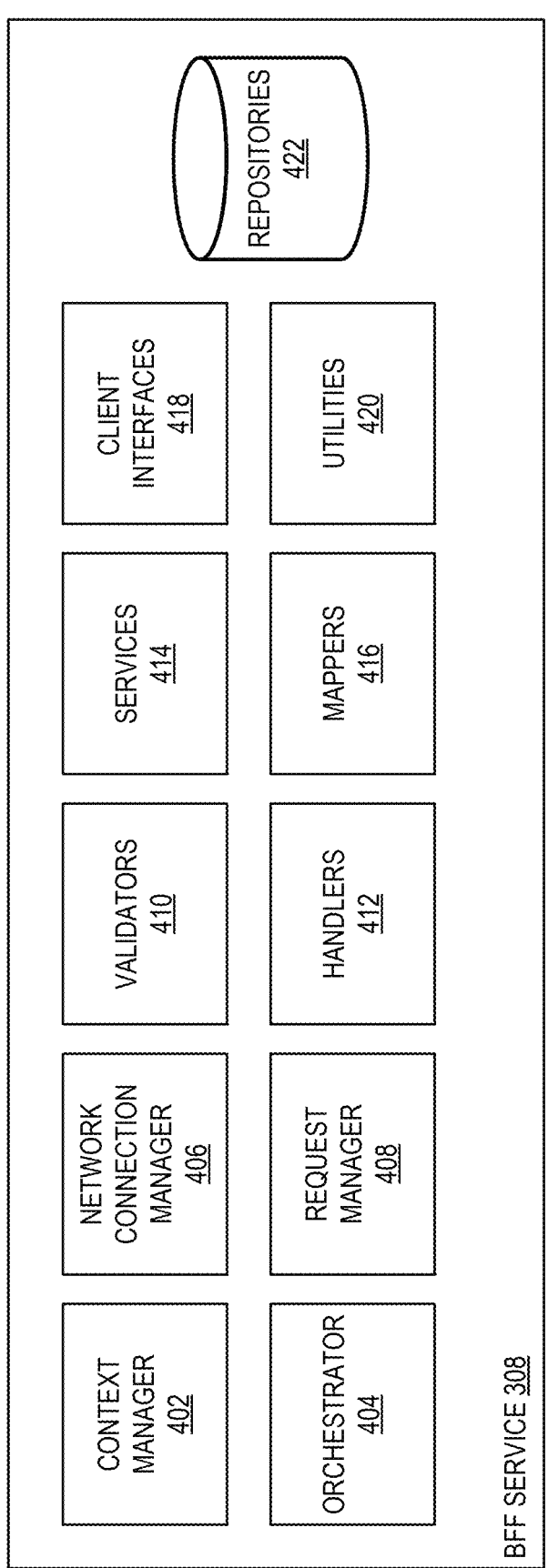
FIG. 4 illustrates a block diagram of components of an example backend-for-frontend service configured to intelligently manage and route content updates to client devices on the online sportsbook platform of FIG. 1, according to an embodiment.

Referring now to FIG. 4, a block diagram illustrating additional components of the BFF service 308 are shown. Illustratively, the BFF service 308 includes a context manager 402, orchestrator 404, network connection manager 406, request manager 408, validators 410, handlers 412, services 414, mappers 416, client interfaces 418, and repositories 420. Of course, the BFF service 308 may include additional components not currently shown.

The context manager 402 is configured to track client-level user activity with the platform 102, such as contexts and interactions with a platform user interface by the user. The context manager 402 tracks the user activity occurring over the network connection (e.g., the WebSocket connection initially opened by the client device 108 with the platform 102) within the GUI of the app 110 and caches the user activity. For example, the context manager 402 may cache information such as client device information, date and time accessed, pages within the user interface accessed, subpage information, APIs accessed information, bet information, league information, team information, and so on.

The orchestrator 404 coordinates data flows between the client devices 108 and APIs of the platform application 106. For example, the orchestrator 404 is configured to coordinate retrieval of initial data streams from multiple APIs (of the platform application 106) via a network connection, such as HTTP connections. The orchestrator 404 coordinates transmission of data object streams from one or more APIs (based on observed user activity).

The network connection manager 406 controls the network connections between the client device 108 and the BFF service 308. The network connection manager 406 may support different types of network connection protocols, such as HTTP, WebSocket, SSE, and the like, in handling network connection requests. The request manager 408 controls request pipelines for different types of network connection requests transmitted by the client device 108, such as HTTP-based requests and WebSocket requests. The request manager 408 may generate responses acknowledging the requests for transmission to the client devices 108. To do so, the request manager 408 may include sub-modules such as request controllers (e.g., Mediat® request controllers for handling HTTP requests; WebSocket middleware, etc.) associated with the respective request pipeline.

The validators 410 evaluate requests transmitted by the client devices 108 based on an underlying resource or service specified in the request. Particularly, the validators 410 determine whether the requested resource or service has changed since the most recent access by the client device 108. For example, the validators 410 can include HTTP request validators for different pages of the web interface of the platform 102 (e.g., request validators for bets pages requests, events requests, cashout requests).

The handlers 412 process the validated requests and pass the requests onto relevant services 414. The services 414 coordinate interactions with corresponding backend components of the platform application 106. For instance, services 414 of the example online sportsbook platform may include ones for bets, cashout, and events. The services 414 may coordinate calls to the APIs of the platform application 106 based on the underlying request. The client interfaces 418 may be configured to carry out the calls to the APIs. The mappers 416 provide mappings between backend and frontend data and response formats to transform backend data to frontend objects for transmission to the client device 108. For example, mappers 416 may function for different pages of the GUI of the app 110 and corresponding APIs of the platform application 106. Once mapped, the handler 412 may send a formatted response to the client device 108.

The repositories 420 store cached data associated with client device accesses to backend resources and components. In an embodiment, the repositories 420 may include separate cache repositories for different contexts and activities (e.g., an event stream repository, sports data repository, bets reporting repository, cashout repository, etc.).

Figure 5:
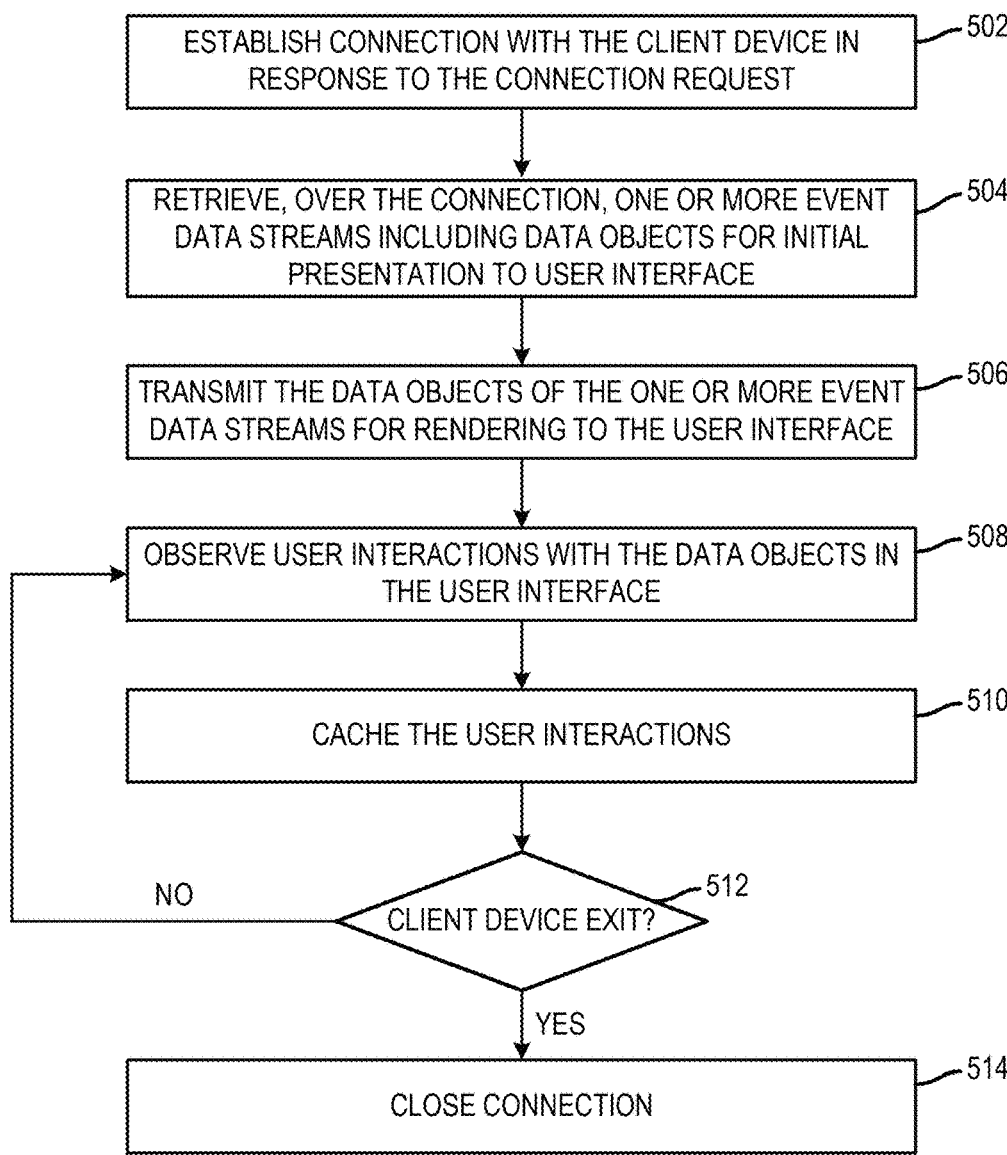
FIG. 5 illustrates a flow diagram of an example method for tracking client device activity across the online sportsbook platform of FIG. 1 for intelligently routing content updates to the client device, according to an embodiment.

Referring now to FIG. 5, a method 500 for tracking user interactions by the BFF service 308 is shown. In block 502, the server system 104 (e.g., via the BFF service 308) establishes a network connection with the client device 108. The network connection may for example be a WebSocket connection or some other bidirectional network connection that allows for quick server-pushed transmissions such as content updates.

Figure 7:
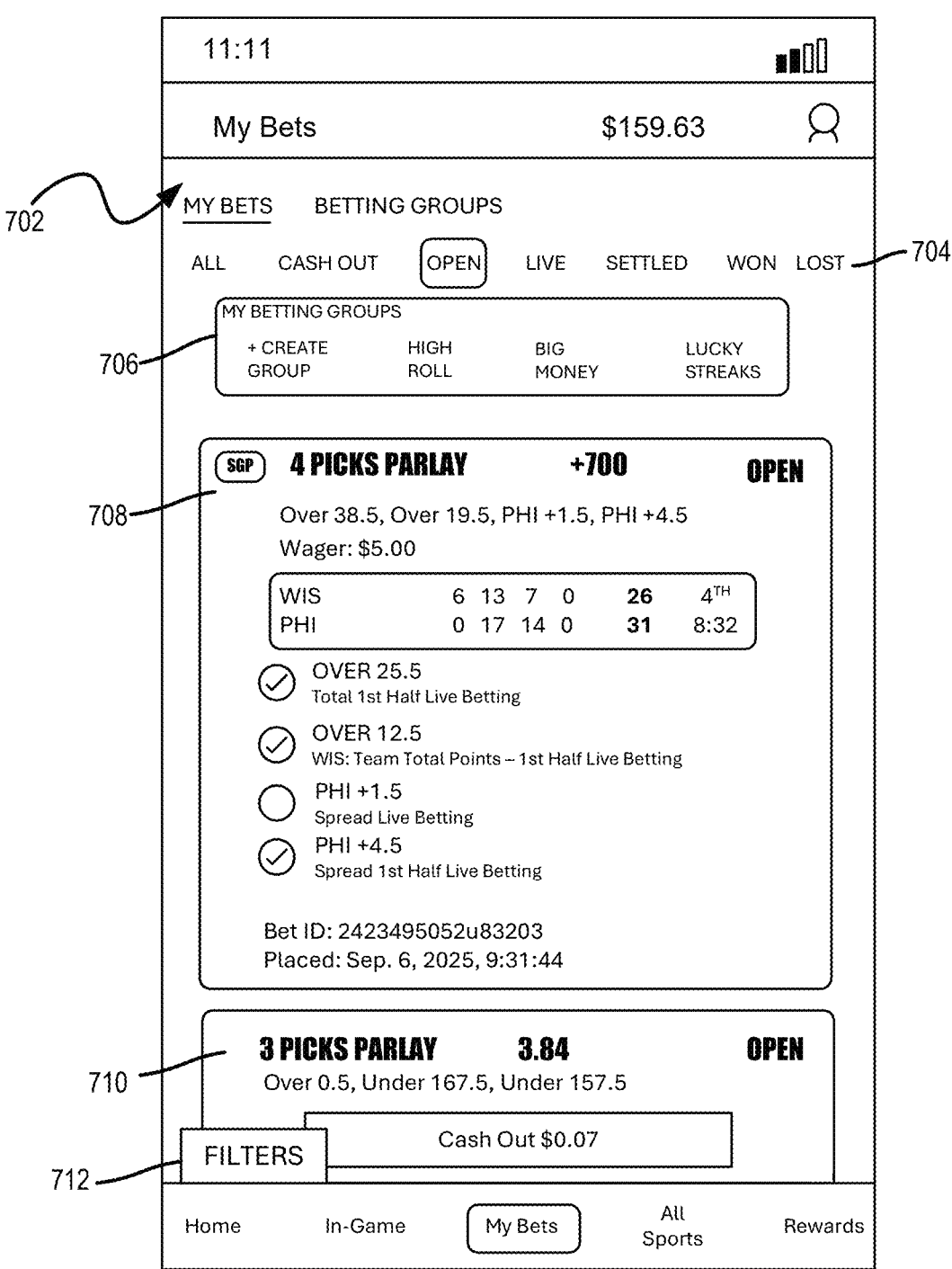
FIG. 7 illustrates a graphical user interface (GUI) of an application executing on a client device capable of receiving real-time content updates, according to an embodiment.

In block 504, the server system 104 retrieves, over the connection, one or more event data streams including data objects for initial presentation to the user interface. In this example, assume that the user of the client device 108 navigates, over the WebSocket connection, to a GUI that provides access to the user's bets information. The server system 104, in obtaining content for presentation to the GUI, may make various calls to platform APIs that serve data such as placed bets, events, cashout options, and the like, as shown in. For instance, turning briefly to FIG. 7, an example app 110 user interface 702 is shown displaying a "My Bets" interface including tabs 704 (allowing the user to apply filters of user bets such as "All," "Cash Out," "Open," "Live," "Settled," "Won," and "Lost"), links to user-created betting groups 706, bet cards 708 (including real-time displays for a single game parlay bet) and 710 (including an option to cash out of a parlay bet prior to the event close), and a filter selection button 712.

Each of 704, 706, 708, and 710 may correspond to (or include) data objects provided by the event data streams. More specifically, each data stream may include data objects such as bet objects (including bet identifier information, event identifier information, wager amount, potential payout amounts, odds, bet type such as whether a spread, money-line, or parlay bet, status information associated with the bet, a timestamp, whether cashout is available, etc.), event objects (including event identifier information, league information, start time, anticipated end time, current score, current quarter or period, game status, etc.), market objects (e.g., including information such as market identifier, market type, betting line, current odds, status, etc.), cashout offer objects (e.g., including information such as offer amount, time offered, expiration time, availability status, etc.), and the like. In block 506, the server system 104 transmits the one or more data objects from the event data streams to the client device 108 for rendering over the user interface.

In block 508, the server system 104 observes user inter-actions with the data objects in the user interface. For example, the server system 104 may track, over the Web-Socket connection, API function calls, pages accessed by the user on the app 110, and the like. In an embodiment, the app 110 may track, over the WebSocket connection, a length of time that a user is interacting with a given page or section of the GUI. In block 510, the server system 104 caches the user interactions. The cached data may include a user identifier (associated with the user account accessing the platform 102), session identifier or token, activity, timestamp, service and/or resource accessed, and so on.

In block 512, the server system 104 determines whether the client device 108 has exited the app 110. For example, the server system 104 may detect a network connection reset, WebSocket close frame, or a session timeout. As another example, the client device 108 may transmit an indication such as an "app closed" message to the server system 104. If the server system 104 detects that the client device 108 has exited, then in block 514, the server system 104 closes the connection.

Figure 6:
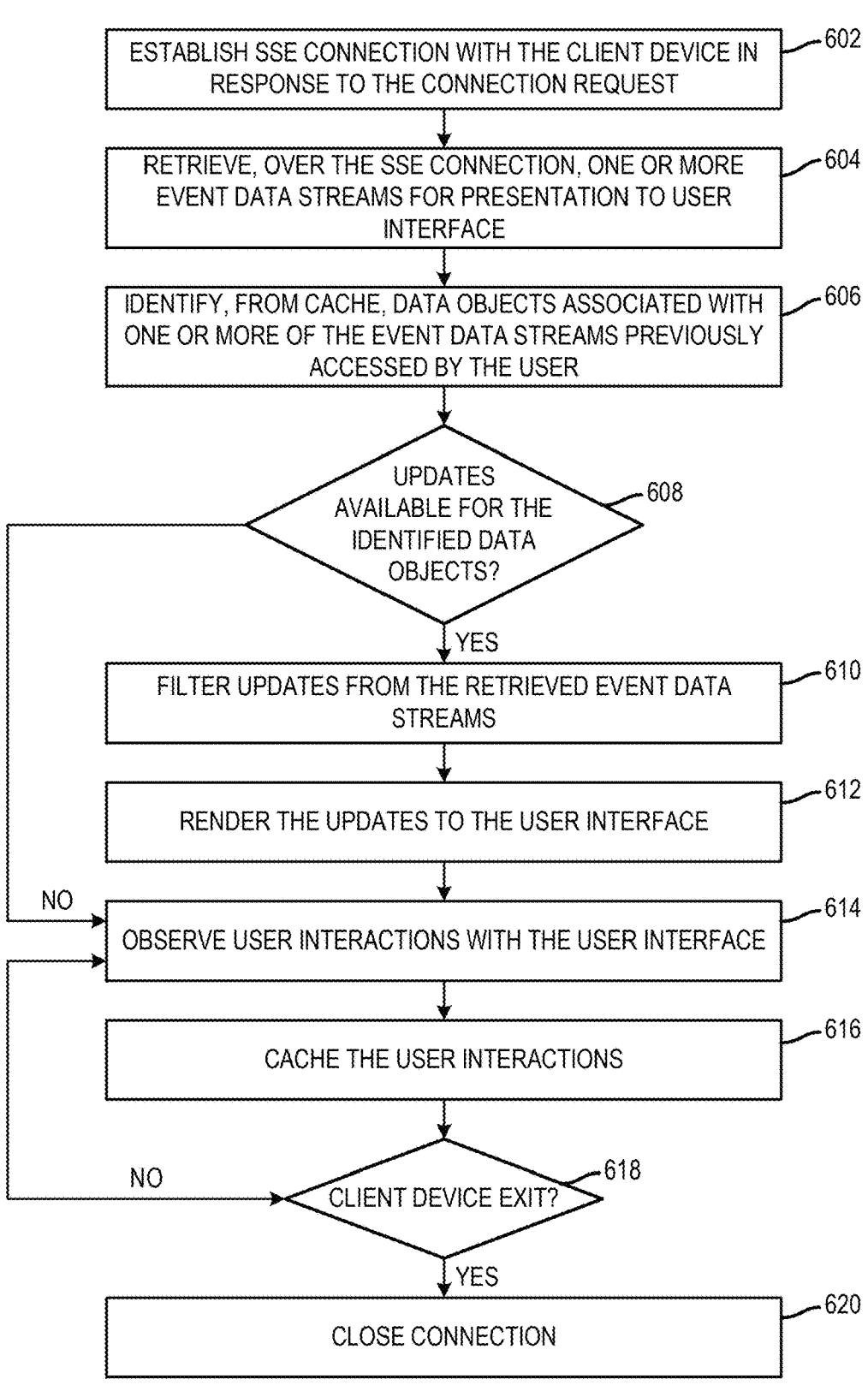
FIG. 6 illustrates a flow diagram of an example method for managing content updates, according to an embodiment.

The caching of user activity allows the server system 104 to determine which update of the app 110 to prioritize during subsequent interactions with the platform 102. Referring now to FIG. 6, a method 600 for distributing content updates to a client device 110 is shown. As shown, the method 600 begins in block 602, in which the server system 104 estab-lishes a network connection with the client device 108 in response to a connection request by the client device 108. For example, in an embodiment, the server system 104 establishes a SSE connection.

In block 604, the server system 104 retrieves, over the network connection, one or more event data streams for presentation to the user interface of the app 110. In block 606, the server system 104 identifies, from the cache, data objects associated with one or more of the event data streams previously accessed by the user. In block 608, the server system 104 determines whether any updates are available for the identified data objects. For example, the server system 104 may identify, from the cache which APIs and/or data objects were previously accessed by the app 110. In an embodiment, the server system 104 may, determine, as a function of time or a decay function, the most recently accessed APIs and/or data objects.

In block 610, the server system 104 filters updates from the retrieved event data streams. In block 612, the server system 104 transmits the updates to the client device 108 for rendering on the user interface. The server system 104 may continue to observe user activity to identify relevant content to display to the user. In block 614, the server system 104 observes user interactions with the user interface. In block 616, the server system 104 caches the user interactions. In block 618, the server system 104 determines whether the client device has exited the app 110. If so, then in block 620, the server system 104 closes the connection. In an embodi-ment, the server system 104 may close user-specific SSE-based connections to dependency APIs and keep subscrip-tions up-to-date. Doing so ensures that only relevant updates over longer-open network connections are transmitted to the client device 108.

Methods 500 and 600 may be adapted to enhance visu-alizations of client-side user interfaces for the platform, such as the GUIs of app 110 or web interface, by integrating multiple data streams from different APIs based on cached user interactions. The app 110 (or other client-side user interface) may periodically update visualized data in-place based on updated data streams sent by the server system 104 (via the BFF service 308) over the network connection. For example, the online sportsbook platform may provide bet updates that incorporate data from separate APIs (e.g., APIs relating to bet reporting, event results, bet histories) to the app 110 for presentation on the client device 108. As another example, the server system 104 (via the BFF service 308) may allow the client device 108 to subscribe for and receive updates outside of the user interfaces of the app 110 or web interface, such as via the Live Activities feature of the iOS operating system. To do so, the BFF service 308 may include mechanisms for registering or deregistering a bet as a live activity object, starting and ending the live activity, gener-ating updates, and pushing updates to the client device 108. As yet another example, the example online sportsbook platform may use the disclosed technologies to provide live game scoreboards, e.g., for sports games currently in play, in the bets interface.

For the purposes of promoting an understanding of the principles of the present disclosure, reference is made herein to preferred embodiments and specific language is used to describe the same. It will nevertheless be understood that no limitation of the scope of the disclosure is thereby intended, such alteration and further modifications of the disclosure as illustrated herein, being contemplated as would normally occur to one skilled in the art to which the disclosure relates.

Articles "a" and "an" are used herein to refer to one or to more than one (i.e. at least one) of the grammatical object of the article. By way of example, "an element" means at least one element and can include more than one element.

"About" is used to provide flexibility to a numerical range endpoint by providing that a given value may be "slightly above" or "slightly below" the endpoint without affecting the desired result.

The use herein of the terms "including," "comprising," or "having," and variations thereof, is meant to encompass the elements listed thereafter and equivalents thereof as well as additional elements. As used herein, "and/or" refers to and encompasses any and all possible combinations of one or more of the associated listed items, as well as the lack of combinations where interpreted in the alternative ("or").

Moreover, the present disclosure also contemplates that in some embodiments, any feature or combination of features set forth herein can be excluded or omitted. To illustrate, if the specification states that a complex comprises compo-nents A, B and C, it is specifically intended that any of A, B or C, or a combination thereof, can be omitted and dis-claimed singularly or in any combination.

Unless otherwise defined, all technical terms used herein have the same meaning as commonly understood by one of ordinary skill in the art to which this disclosure belongs.

Another aspect of the present disclosure is a system. The system can be implemented in hardware, software, firmware, or combinations of hardware, software and/or firmware. In some examples, the system and methods described in this specification may be implemented using a non-transitory computer readable medium storing computer executable instructions that when executed by one or more processors of a computer cause the computer to perform operations.

Another aspect of the present disclosure provides all that is described and illustrated herein.

One skilled in the art will readily appreciate that the present disclosure is well adapted to carry out the objects and obtain the ends and advantages mentioned, as well as those inherent therein. The embodiments of the present disclosure described herein are presently representative of preferred embodiments, are examples, and are not intended as limitations on the scope of the present disclosure. Changes therein and other uses will occur to those skilled in the art which are encompassed within the spirit of the present disclosure as defined by the scope of the claims.

No admission is made that any reference, including any non-patent or patent document cited in this specification, constitutes prior art. In particular, it will be understood that, unless otherwise stated, reference to any document herein does not constitute an admission that any of these documents forms part of the common general knowledge in the art in the United States or in any other country. Any discussion of the references states what their authors assert, and the applicant reserves the right to challenge the accuracy and pertinence of any of the documents cited herein. All references cited herein are fully incorporated by reference, unless explicitly indicated otherwise. The present disclosure shall control in the event there are any disparities between any definitions and/or description found in the cited references.

The invention claimed is:

1. A system comprising:
one or more processors; and
a memory storing a plurality of instructions, which, when executed on the one or more processors, cause the system to:
receive a first connection request from a client device to access one or more resources of a software platform via a client application executing on the client device;
establish, in response to the first connection request, a bidirectional network connection with the client device;
retrieve one or more initial data streams from a plurality of application programming interfaces (APIs) of the software platform;
transmit, to the client device over the bidirectional network connection, the initial one or more data streams for presentation on a user interface of the client application;
receive, from the client device over the bidirectional network connection, one or more indications of user interactions with the at least one of the initial one or more data streams, the user interactions comprising page access events, selections of data objects, and durations of display of user interface components;
for each indication of user interactions:
identify a data object displayed to the client device, and map the indication to the identified data object;
determine, based on the one or more indications, a subset of the one or more of the initial data streams for continued transmission of real-time content updates to the client device, wherein determining the subset comprises filtering out backend updates unrelated to the mapped data objects;
receive a second connection request from the client device to access the one or more resources of the software platform via the client application;
establish, in response to the second connection request, a second network connection with the client device;
retrieve the subset of the one or more of the initial data streams from the plurality of APIs; and
transmit, over the second network connection, the retrieved subset for presentation on the user interface.

2. The system of claim 1, wherein the bidirectional network connection is a WebSocket connection.

3. The system of claim 2, wherein the second network connection is a Server Sent Event (SSE) connection.

4. The system of claim 1, wherein the plurality of instructions further cause the system to cache the indications of user interactions of the at least one of the initial one or more data streams.

5. The system of claim 3, wherein to determine the subset of the one or more of the initial data streams is based on the cached indications.

6. The system of claim 5, wherein the subset is based on a frequency of user interactions with the at least one of the initial one or more data streams.

7. The system of claim 5, wherein the plurality of instructions further cause the system to filter the at least one of the initial one or more data streams based on the cached indications.

8. A method comprising:
receiving a first connection request from a client device to access one or more resources of a software platform via a client application executing on the client device;
establishing, in response to the first connection request, a bidirectional network connection with the client device;
retrieving one or more initial data streams from a plurality of application programming interfaces (APIs) of the software platform;
transmitting, to the client device over the bidirectional network connection, the initial one or more data streams for presentation on a user interface of the client application;
receiving, from the client device over the bidirectional network connection, one or more indications of user interactions with the at least one of the initial one or more data streams, the user interactions comprising page access events, selections of data objects, and durations of display of user interface components;
for each indication of user interactions:
identifying a data object displayed to the client device, and
mapping the indication of the identified data object;
determining, based on the one or more indications, a subset of the one or more of the initial data streams for continued transmission of real-time content updates to the client device, wherein determining the subset comprises filtering out backend updates unrelated to the mapped data objects;

receiving a second connection request from the client device to access the one or more resources of the software platform via the client application;

establishing, in response to the second connection request, a second network connection with the client device;

retrieving the subset of the one or more of the initial data streams from the plurality of APIs; and transmitting, over the second network connection, the retrieved subset for presentation on the user interface.

9. The method of claim 8, wherein the bidirectional network connection is a WebSocket connection.

10. The method of claim 9, wherein the second network connection is a Server Sent Event (SSE) connection.

11. The method of claim 8, further comprising caching the indications of user interactions of the at least one of the initial one or more data streams.

12. The method of claim 11, wherein determining the subset is based on the cached indications.

13. The method of claim 12, wherein the subset is based on a frequency of user interactions with the at least one of the initial one or more data streams.

14. The method of claim 13, further comprising filtering the at least one of the initial one or more data streams based on the cached indications.

15. One or more non-transitory machine-readable storage media comprising a plurality of instructions, which, when executed on one or more processors, causes a system to:

receive a first connection request from a client device to access one or more resources of a software platform via a client application executing on the client device;

establish, in response to the first connection request, a bidirectional network connection with the client device;

retrieve one or more initial data streams from a plurality of application programming interfaces (APIs) of the software platform;

transmit, to the client device over the bidirectional network connection, the initial one or more data streams for presentation on a user interface of the client application;

receive, from the client device over the bidirectional network connection, one or more indications of user interactions with the at least one of the initial one or more data streams, the user interactions comprising page access events, selections of data objects, and durations of display of user interface components;

for each indication of user interactions:

identify a data object displayed to the client device, and map the indication to the identified data object;

determine, based on the one or more indications, a subset of the one or more of the initial data streams for continued transmission of real-time content updates to the client device, wherein determining the subset comprises filtering out backend updates unrelated to the mapped data objects;

receive a second connection request from the client device to access the one or more resources of the software platform via the client application;

establish, in response to the second connection request, a second network connection with the client device;

retrieve the subset of the one or more of the initial data streams from the plurality of APIs; and transmit, over the second network connection, the retrieved subset for presentation on the user interface.

16. The one or more non-transitory machine-readable storage media of claim 15, wherein the bidirectional network connection is a WebSocket connection, and wherein the second network connection is a Server Sent Event (SSE) connection.

17. The one or more non-transitory machine-readable storage media of claim 15, wherein the plurality of instructions further cause the system to cache the indications of user interactions of the at least one of the initial one or more data streams.

18. The one or more non-transitory machine-readable storage media of claim 17, wherein to determine the subset of the one or more of the initial data streams is based on the cached indications.

19. The one or more non-transitory machine-readable storage media of claim 18, wherein the subset is based on a frequency of user interactions with the at least one of the initial one or more data streams.

20. The one or more non-transitory machine-readable storage media of claim 18, wherein the plurality of instructions further cause the system to filter the at least one of the initial one or more data streams based on the filtered cached indications.

* * * * *